United States Patent [19]
Boucher et al.

[11] Patent Number: 5,581,025
[45] Date of Patent: Dec. 3, 1996

[54] MARINE INSTRUMENT

[75] Inventors: Stephen G. Boucher, Amherst; Maurice Lagace, Peterborough, both of N.H.

[73] Assignee: Airmar Technology Corp., Milford, N.H.

[21] Appl. No.: 599,751

[22] Filed: Feb. 12, 1996

[51] Int. Cl.[6] .................................................. G01C 21/00
[52] U.S. Cl. ............................................... 73/187; 73/185
[58] Field of Search .............................. 73/181, 185, 187, 73/861.78, 861.79

[56] References Cited

U.S. PATENT DOCUMENTS

| | | | |
|---|---|---|---|
| 3,137,164 | 6/1964 | Spencer, Jr. | 73/187 |
| 3,457,782 | 7/1969 | Maeder et al. | 73/187 |
| 3,496,770 | 2/1970 | Fassett, II | 73/187 |
| 3,706,224 | 11/1972 | Overs | 73/187 |
| 3,744,257 | 7/1973 | Spanner | 61/46.5 |
| 4,206,637 | 6/1980 | Pankonien | 73/187 |
| 4,507,960 | 4/1985 | Hufnagel et al. | 73/187 |
| 4,555,938 | 12/1985 | Boucher et al. | 73/187 |
| 4,644,787 | 2/1987 | Boucher et al. | 73/187 |
| 4,898,029 | 2/1990 | Boucher | 73/187 |
| 5,186,050 | 2/1993 | Lagace et al. | 73/187 |
| 5,369,360 | 11/1994 | Amyot | 324/174 |

*Primary Examiner*—Richard Chilcot
*Assistant Examiner*—Ronald L. Biege
*Attorney, Agent, or Firm*—Hamilton, Brook, Smith & Reynolds, P.C.

[57] ABSTRACT

A through-hull speed sensor of the magnetized paddlewheel sensor type wherein a paddlewheel is rotatably supported in a cavity adjacent a magnetic sensing device which generates electrical pulses corresponding to paddlewheel speed as the wheel rotates when the vessel moves through water. The sensor has improved linearity provided by a flow channel recessed in a downstream surface of a sensor mounting member. The recessed flow channel raises the trailing edge above the leading edge, thereby reducing pressure on a back wall of the cavity where the pressure is due to fluid flow through the paddlewheel.

14 Claims, 5 Drawing Sheets

5,581,025

MARINE INSTRUMENT

BACKGROUND OF THE INVENTION

This invention relates to marine instruments and in particular to speed sensors for providing information with respect to marine vehicles traveling through water.

Boucher et al. in U.S. Pat. No. 4,555,938 describes a transom mounted marine speed sensor of the paddlewheel type, in which the paddles or blades are asymmetric in shape and formed of magnetized amorphous magnetic material. As the marine vessel passes through water, the paddlewheel rotates about an axis which is transverse the direction of travel. A Hall-effect device adjacent the paddlewheel senses the change in the magnetic field emanating from the paddles and generates an electrical signal directly proportional to the rotational speed of the paddlewheel. Generally, the rotational speed of the paddlewheel is linearly related to the vessel speed, but this is not always the case; especially at the extremes of high and low speeds.

Maeder et al. in U.S. Pat. No. 3,457,782 discloses a "through-hull" type sensor which employs a waterwheel having a plurality of buckets, closed at their side, and recessed in the peripheral edge of the wheel. The slot within which the wheel rotates is open on the downstream side. According to Maeder et al., this provides a relief space which prevents a buildup of pressure on that side, which would vary the rotational characteristics of the wheel.

Boucher in U.S. Pat. No. 4,898,029 discloses a through-hull paddlewheel sensor mounted in a housing which projects below the boundary layer of water formed on the hull of a boat as the boat traverses the water. The leading edge, i.e., the surface upstream of the paddlewheel, and trailing edge are co-planar.

SUMMARY OF THE INVENTION

Flow problems exist with speed sensors in which the leading edge and trailing edge are co-planar. In normal operation, the angle of attack of a boat increases as the boat passes from displacement mode to the onset of planing. As the boat planes the angle of attack is reduced. To further increase speed, the trim of the boat is altered to increase the angle of attack, which raises the bow, thereby reducing the wetted surface of the hull. As the angle of attack increases, the back wall of the paddlewheel cavity becomes a high pressure area since the fluid flow stalls. In the vicinity of the back wall, the paddlewheel rotates upwardly. As the paddles of the rotating paddlewheel enter this area, fluid is entrained and there is some circulation around the cavity. At slow speeds, this high pressure area at the bottom of the back wall exaggerates the nonlinear behavior caused by the boundary layer.

Accordingly, a need exists for a through-hull speed sensor with improved performance, especially at high speeds, which does not at the same time sacrifice low speed linearity and accuracy.

In accordance with the invention, a flow channel is provided recessed in a downstream surface of the housing. The recessed flow channel raises the trailing edge above the leading edge, thereby reducing pressure on the back wall of the housing cavity created by fluid flow through the paddlewheel. This results in a significant increase in sensor linearity in the range of about 3 knots to about 40 knots.

In a preferred embodiment of the invention, a speed sensor for mounting to a hull comprises a tubular housing and a mounting member secured to the hull. The mounting member has a bottom surface having laterally extending upstream and downstream surfaces. A paddlewheel having a series of paddles extending from a central hub is rotatably disposed in a cavity formed in the bottom surface of the mounting member. A sensor is located adjacent the paddlewheel. In the downstream surface of the mounting member, a channel is formed adjacent the cavity and is oriented in the direction of fluid flow, such that pressure on the downstream wall Of the cavity created by fluid flow through the paddlewheel is reduced.

According to one aspect of the invention, the channel gradually recesses into the mounting member towards the downstream wall of the cavity and comprises a pair of opposed side walls having an open underside.

According to another aspect of the invention, the channel decreases in depth and increases in width from the downstream wall towards one end.

In one of the preferred embodiments, a bow portion of the mounting member holds a sonar transducer element for sensing depth of water, while the aft portion houses a Hall-effect device for sensing the rotating magnetic field created as the paddlewheel revolves. Optionally, a thermal sensor, in the form of a thermistor, may be located in the aft or bow portion, to sense water temperature.

DETAILED DESCRIPTION OF THE INVENTION

Figure 1:
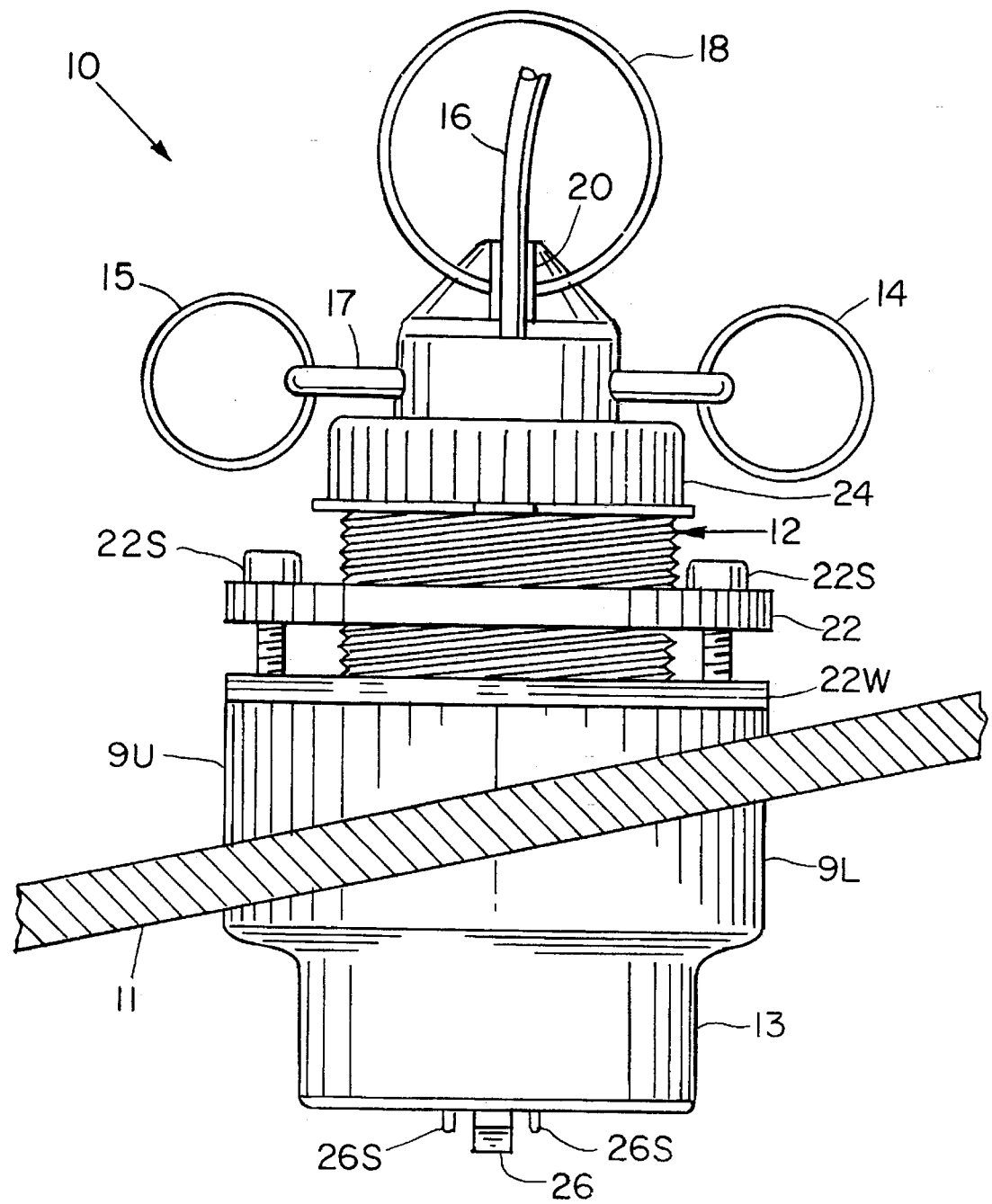
FIG. 1 is an elevational frontal view of a high speed through-hull speed sensor in accordance with the invention including the hull 11 and fairing and leveling blocks 9L, 9U respectively.

The invention will now be described in detail in connection with the drawings. Referring now to FIGS. 1, 2A, 2B and 3, there is shown a preferred embodiment of the invention comprising a high speed through-hull tri-sensor device 10 for marine vessels comprised of an external housing 12 and a boat-shaped mounting member 13 extending horizontally. The external housing 12 is formed of stainless steel and includes a vertically extending tubular portion 12T and a horizontally extending plate portion 12P. The device 10 may be mounted through a boat hull 11 as shown in FIG. 1. Upper wedge or leveling block 9U and lower fairing block 9L are wedged between the top surface of mounting member 13, hull 11 and lock-nut 22, to position sensor 10 in a vertical plane.

The tubular housing portion 12T extends through an opening in the boat hull 11. Lock nut 22 has internal threads which engage a set of external threads 21 on the tubular housing portion 12T. A washer 22W slideably mounts on the exterior periphery of tubular housing portion 12T. Lock nut 22 is pressed against the upper surface of washer 22W by screws 22S positioned in lock nut 22 to retain the housing when mounted through an opening in the boat hull 11. A cap nut 24 includes threads which engage the external threads 21 of tubular housing 12T to permit entry or removal of an internal housing in the form of a tubular body 52. Plate portion 12P is mounted to the top of mounting member 13 via mounting screws 55 (only the aft mounting screw is shown).

Tubular body 52, formed of metal or plastic, is adapted to be slideably inserted into the external housing 12 and comprises an upper body portion 52U, an intermediate body portion 52M, and a lower body portion 52L. The lower body portion 52L extends to the bottom of mounting member 13 and forms a paddlewheel cavity 30 in which a paddlewheel 26 is rotatably retained. Seal rings 32 and 34, respectively, are disposed in grooves on the periphery of the lower body portion 52L and form a fluid-tight seal between the body 52 and external housing 12. Intermediate tubular body portion 52M is press fitted between lower body portion 52L and upper body portion 52U. Upper body portion 52U includes a vane valve 54 substantially as described in U.S. Pat. No. 5,186,050 incorporated herein by reference. The vane valve 54 is a self-closing valve which prevents water from entering the boat when sensor paddlewheel 26 is removed from tubular body 52 for maintenance.

A cable 16 containing wires 19 is coupled through a hole 27 formed in an enlarged wall of tubular housing portion 12T. Wires 19 provide electrical connection to components, such as Hall-effect device 56, sonar transducer 60, and thermistor 62, affixed to the inner walls of mounting member 13. The top end of upper body portion 52U includes a tab 20, through which a pull ring 18 is attached to aid in removal of the tubular body 52 when nut 24 is removed.

A second pull ring 14 is affixed to pin 17 which extends through a bore in upper body portion 52U. The relative location of the bores assures that when pin 17 is in place, the tubular body 52 is vertically aligned so that the bottom wall 52B is coplanar, or flush, with the bottom of the mounting member 13. Removable lock ring 15 is used to secure the pin 17 in place.

Figure 2A:
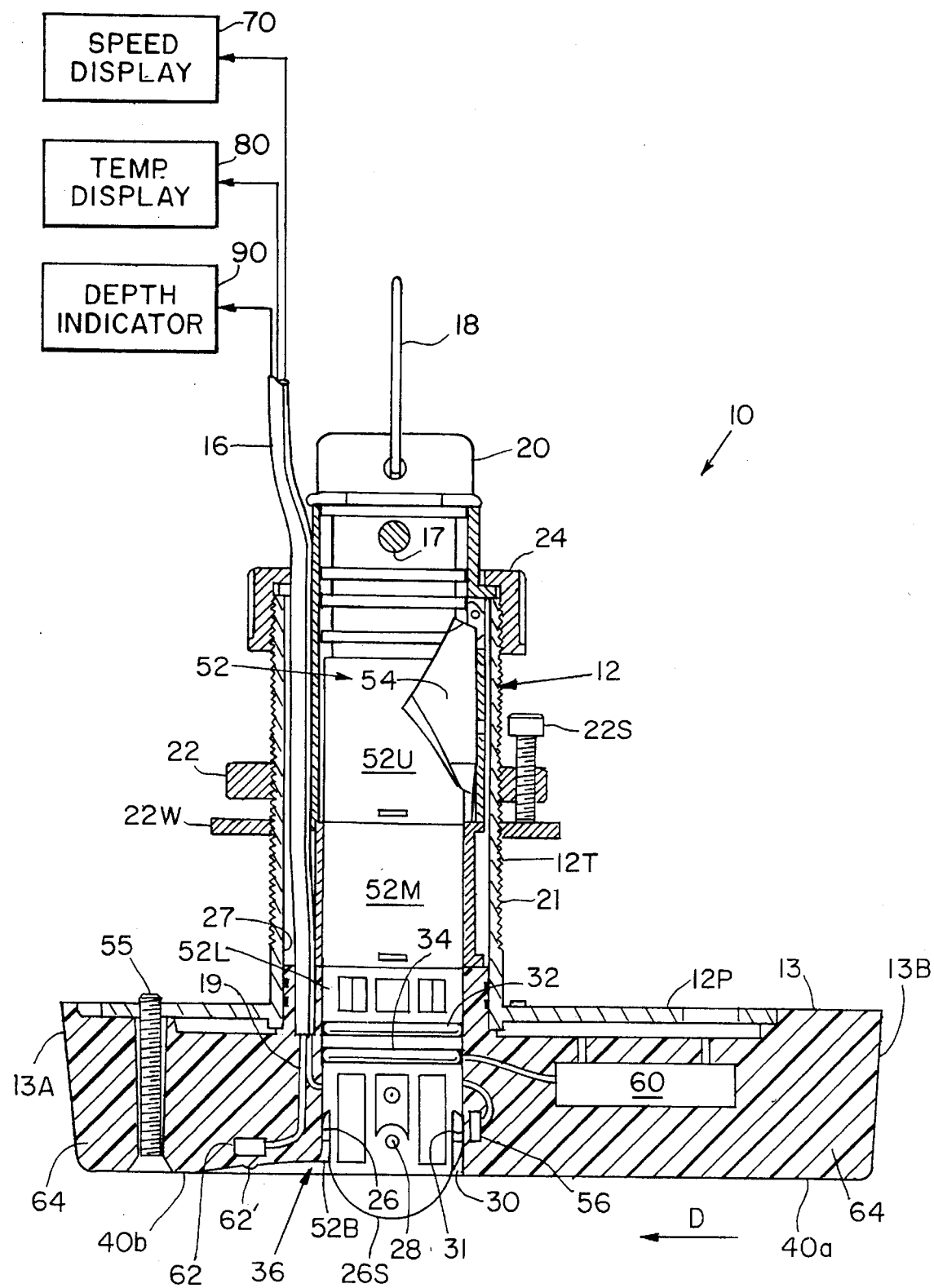
FIG. 2A is a cross-sectional view of the sensor of FIG. 1, with washer 22W shown in a mounted position and which, for simplicity, omits the fairing and leveling blocks 9L, 9U respectively, and the detail cross-section of transducer 60 and Hall-effect device 56.
Figure 2B:
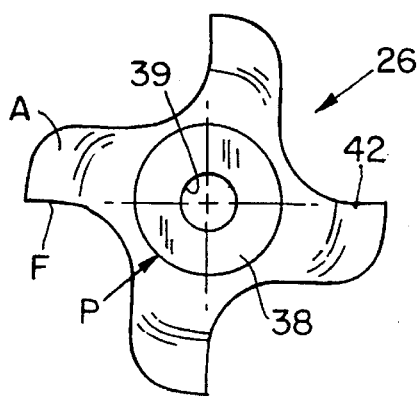
FIG. 2B is a side view of paddlewheel 26 of FIG. 2A.

A paddlewheel 26 is rotatably mounted on axle 28 within the cavity 30 formed in the bottom of lower body portion 52L. The paddlewheel 26 is disposed between peripheral insert portions 26S within the cavity 30. FIG. 2B shows the paddlewheel 26 in detail. Paddlewheel 26 is an integral structure having a hub 38 from which four asymmetric shaped paddles 42 extend about the periphery thereof. The axle 28 rotates within a bore 39 which extends through a central opening in the hub 38, and into opposing recessed holes in the cavity side walls formed in tubular body 52. The paddlewheel 26 is thereby rotatably suspended within the cavity 30. The periphery P of the hub 38 is approximately flush with the bottom surface 52B of the cavity. Each paddle is contoured as a bluff frontal surface F and a convex curve aft surface A to produce a high drag coefficient ratio (aft versus fore) and is substantially as described in U.S. Pat. No. 4,898,029 incorporated herein by reference.

Preferably, paddlewheel 26 is formed of amorphous magnetized material, such as barium ferrite. The paddles 42 may be polarized with respect to the hub, or with respect to each other. As the paddles rotate about the shaft when the vessel traverses the water, the variation in magnetic field is sensed by a Hall-effect device 56 mounted on an upstream interior wall 31 of mounting member 13.

A preferred location for the Hall-effect device 56 is on a mounting member wall closely adjacent the cavity 30, such as wall 31, where it can be encapsulated and protected from the water. Therefore, mounting member 13 is constructed of an electromagnetically permeable material, such as polycarbonate or other suitable plastics.

Sonic transducer assembly 60, thermistor 62, and Hall-effect device 56, are substantially as described in U.S. Pat. No. 4,555,938, incorporated herein by reference, and are electrically coupled via wires 19 to depth indicator 90, temperature display 80, and speed display 70, respectively; also as described therein. The interior of the mounting member, at the bow end 13B, contains sensor 60 and Hall-effect device 56 and is encapsulated in potting material 64, such as polyurethane. Likewise, the interior at the aft end 13A, containing sensor 62, is encapsulated with polyurethane 64.

Figure 3:
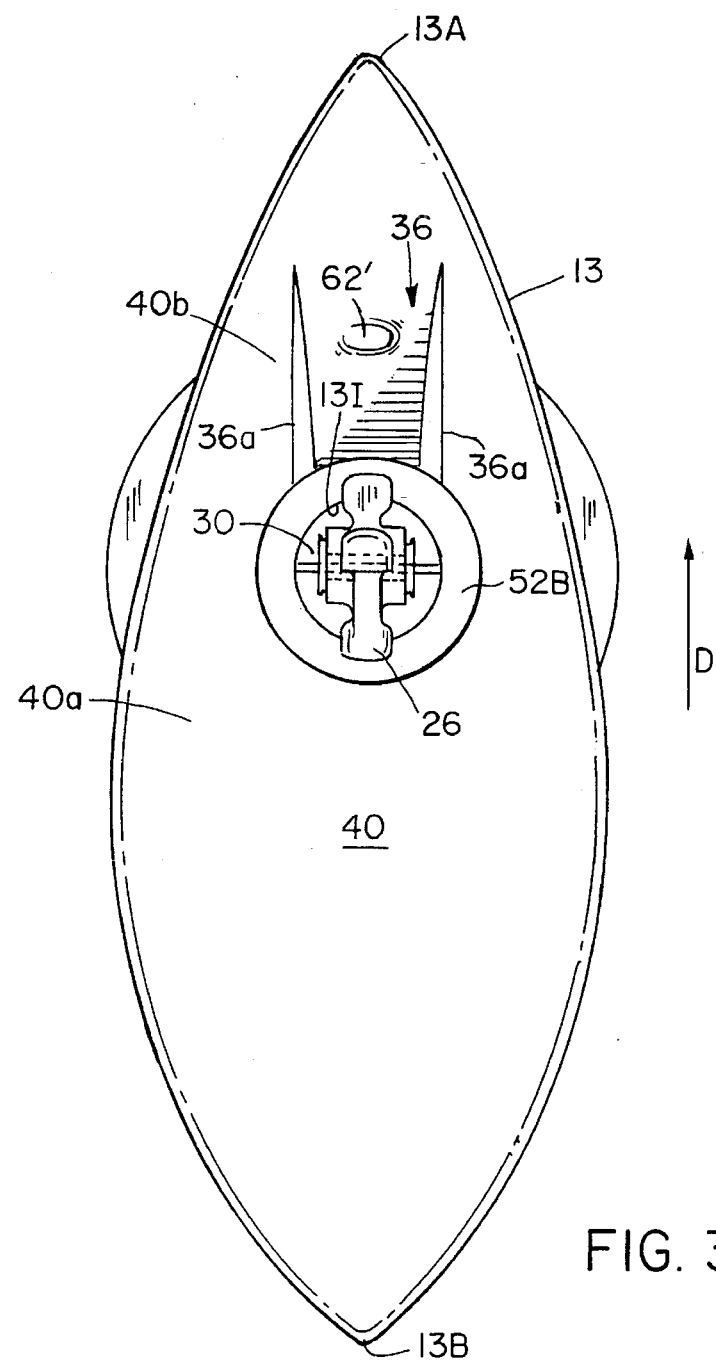
FIG. 3 is a bottom view of the sensor of FIG. 1.

Referring now to FIG. 3, a recessed channel 36 is shown formed in the bottom surface 40 of mounting member 13. More specifically, the channel 36 is formed in a downstream portion 40b of the bottom surface 40. The channel 36 comprises a pair of opposed side walls 36a and has an open underside. The channel 36 extends from a downstream interior wall 13I of the cavity 30 (in which is disposed paddlewheel 26), decreasing in depth and increasing in width towards the opposite end. At its maximum depth adjacent the cavity 30, the channel 36 is approximately co-planar with the center of rotation of paddlewheel 26. The channel width preferably is approximately the width of the cavity 30 encasing the paddlewheel 26. Wider channels will work but are not preferred since there will be some added turbulence generated at the interface between the cavity 30 and the channel 36. The side walls 36a are preferably curved or beveled to enhance the exit flow through the channel but can also be vertical. The channel 36 is preferably integrally formed when molding the plastic mounting member 13. A dimpled projection 62' is formed in the channel 36 to accommodate a temperature sensing device 62.

In operation, as a boat 9 (to which the sensor 10 is attached) is propelled across water, the water impinges on the paddlewheel 26 in the direction D shown in FIG. 3. As paddlewheel 26 rotates, the alternating poles of the paddles 42 cause magnetic field variations which are sensed by Hall-effect device 56. In response to the sensed alternating poles, Hall-effect device 56 generates a squarewave voltage signal that is directly proportional to the rotational speed of the paddlewheel 26. Speedometer display 70 converts this voltage signal into the velocity of the vessel relative to the water with an internal processor.

The effect of the channel 36 on the water flow will now be described. As the water rotates the paddlewheel 26, the paddles rotate upwardly in the vicinity of the downstream interior wall 13I. The channel 36 raises the trailing edge, or downstream surface, relative to the leading edge, or upstream surface. Therefore, pressure on the wall 13I is reduced and the exit flow is more streamlined or less turbulent.

Figure 4:
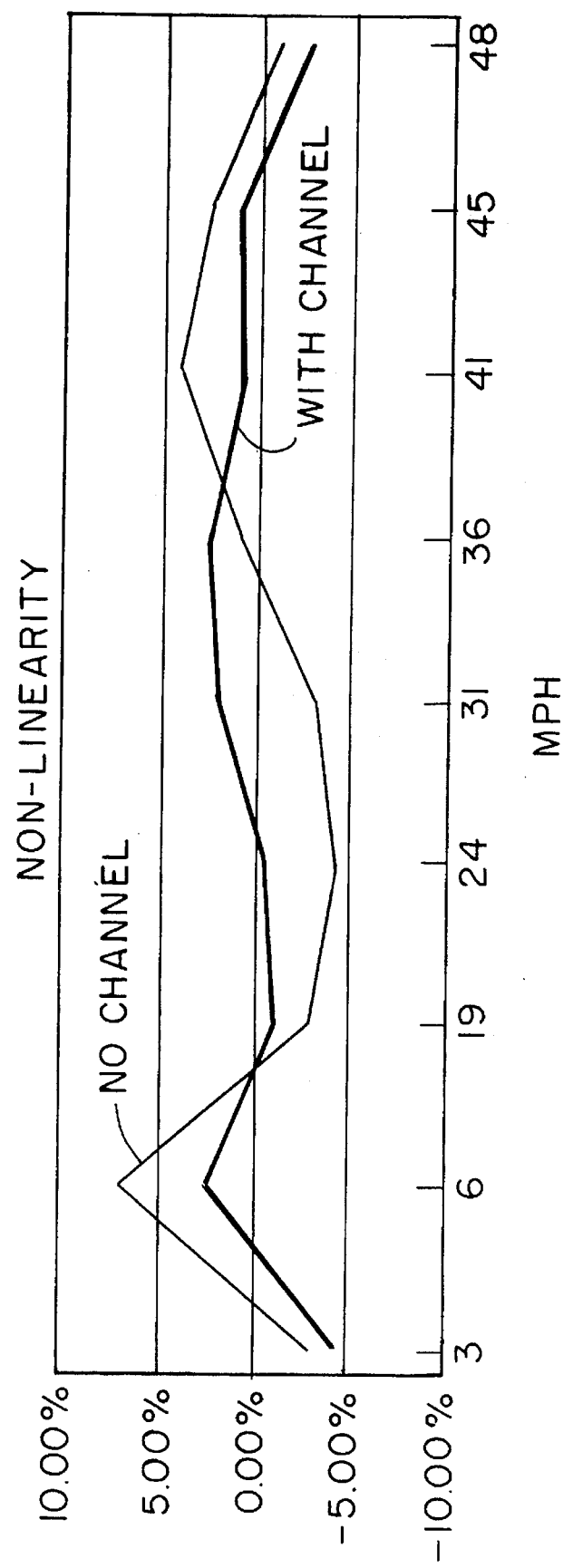
FIG. 4 is a graph depicting experimental data for the preferred embodiment.

The improved flow achieved by the channel 36 provided at the bottom of mounting member 13 translates into a critical increase in sensor linearity in the speed range from about 5 mph to about 48 mph. This improved linearity is illustrated in the graph of FIG. 4. The graph depicts experimental test results of the preferred embodiment, denoted by the line "WITH CHANNEL", and a prior art sensor of similar configuration but with no channel 36 provided, denoted by the line "NO CHANNEL". The results indicate that nonlinearity in the speed sensor is generally reduced over the depicted range of speeds.

Figure 5:
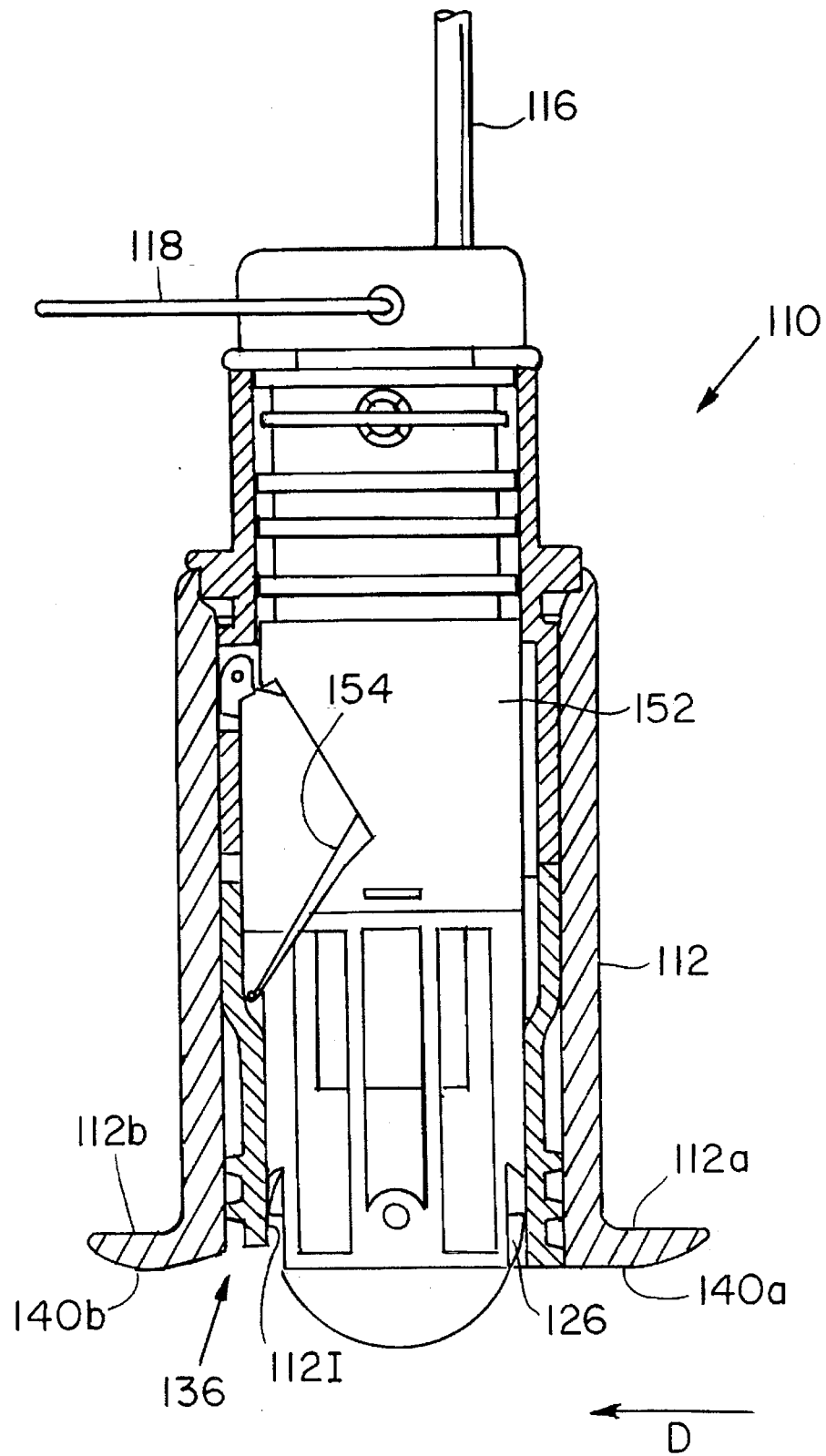
FIG. 5 is a cross-sectional view of an alternate embodiment of the present invention.

An alternate embodiment is shown in cross-section of a through-hull sensor 110 of the flush mounted type in FIG. 5. The sensor 110 includes a paddlewheel 126 formed in a cavity of a tubular housing 112. The paddlewheel 126 is similar to paddlewheel 26 (FIGS. 2A and 2B) and is disposed in the same manner in the cavity. A tubular sleeve 152 slideably mounts in the interior of tubular housing 112. The tubular sleeve 152 is of molded plastic and the housing 112 is formed of metal. A recessed flow channel 136 is formed in a downstream surface 140b of housing 112.

In the alternate embodiment, the tubular housing 112 includes flanged portions 112a and 112b which abut the hull (not shown) when the sensor is mounted through the hull. The recessed flow channel 136 formed in the downstream surface 140b of housing 112 raises the trailing edge above the leading edge, i.e., the upstream surface 140a, such that pressure on the back wall 112I is reduced and the exit flow of fluid is more streamlined or less turbulent. The recessed flow channel 136 has a similar operational benefit as that of the recessed flow channel 36 (FIG. 3), namely, improved sensor linearity across a range of speeds.

Equivalents

While this invention has been particularly shown and described with references to preferred embodiments thereof, it will be understood by those skilled in the art that various changes in form and details may be made therein without departing from the spirit and scope of the invention as defined by the appended claims. For example, paddlewheels of other configurations and non-magnetized paddlewheels can be employed. Additionally, other suitable sensors can be used in place of the Hall-effect sensor, such as a proximity sensor.

What is claimed is:

1. A marine apparatus for mounting to the hull of a marine vessel comprising:

a housing secured to the hull, the housing having a bottom member with a surface extending laterally upstream and downstream with respect to fluid flow when the vessel traverses water;

a walled cavity formed in an opening in the bottom surface of the member;

a paddlewheel having a plurality of paddles extending from a central hub and rotatably disposed in the cavity;

a channel formed in the downstream surface of the member adjacent the cavity and oriented in the direction of fluid flow, such that pressure on a cavity wall located downstream of the fluid flow through the paddlewheel is reduced; and a speed sensor located adjacent the paddlewheel for sensing the speed of the vessel.

2. The apparatus of claim 1 wherein the channel gradually recesses into the member towards the downstream wall of the cavity, the channel comprising a pair of opposed side walls and having an open underside.

3. The apparatus of claim 2 wherein the channel increases in width from the downstream wall of the cavity towards one end.

4. The apparatus of claim 3 wherein the side walls of the channel are formed with a curvature.

5. The apparatus of claim 4 wherein the side walls are beveled.

6. The apparatus of claim 1 further comprising a thermistor mounted in the channel.

7. The apparatus of claim 6 further comprising a sonar transducer element mounted in the member.

8. A marine apparatus for mounting to the hull of a marine vessel comprising:

a housing secured to the hull, the housing having a bottom member with a surface extending laterally upstream and downstream with respect to fluid flow when the vessel traverses water;

a walled cavity formed in an opening in the bottom surface of the member;

a paddlewheel having a plurality of magnetized paddles extending from a central hub and rotatably disposed in the cavity, the periphery of the hub extending no further than the lowest portion of the cavity;

a channel formed in the downstream surface of the member and gradually recessed into the member towards the downstream wall of the cavity, the channel being oriented in the direction of fluid flow, such that pressure on a cavity wall located downstream of the fluid flow through the paddlewheel is reduced; and a magnetic speed sensor located adjacent the paddlewheel for sensing the speed of the vessel.

9. The apparatus of claim 8 wherein the channel comprises a pair of opposed side walls and has an open underside, the channel decreasing in depth from the downstream wall towards one end.

10. The apparatus of claim 9 wherein the channel increases in width from the downstream wall of the cavity towards one end.

11. The apparatus of claim 10 wherein the side walls of the channel are formed with a curvature.

12. The apparatus of claim 11 wherein the side walls are beveled.

13. The apparatus of claim 8 further comprising a thermistor mounted in the channel.

14. The apparatus of claim 13 further comprising a sonar transducer element mounted in the member.

* * * * *